US012631141B1

(12) United States Patent
Hawie et al.

(10) Patent No.: US 12,631,141 B1
(45) Date of Patent: May 19, 2026

(54) SHAFT CENTERING SYSTEMS FOR AIR BEARINGS

(71) Applicant: Pratt & Whitney Canada Corp., Longueuil (CA)

(72) Inventors: Eduardo Hawie, Woodbridge (CA); Dave Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 8 days.

(21) Appl. No.: 19/193,000

(22) Filed: Apr. 29, 2025

(51) Int. Cl.
| | |
|---|---|
| *F02C 7/06* | (2006.01) |
| *F02C 7/28* | (2006.01) |
| *F03G 7/06* | (2006.01) |
| *F16C 17/02* | (2006.01) |

(52) U.S. Cl.
CPC ................. *F02C 7/06* (2013.01); *F02C 7/28* (2013.01); *F03G 7/064* (2021.08); *F16C 17/024* (2013.01); *F05D 2240/50* (2013.01); *F05D 2240/55* (2013.01); *F05D 2240/60* (2013.01); *F05D 2270/303* (2013.01); *F16C 2360/23* (2013.01)

(58) Field of Classification Search
None
See application file for complete search history.

(56) References Cited

U.S. PATENT DOCUMENTS

| | | | | |
|---|---|---|---|---|
| 8,475,048 | B2 * | 7/2013 | Kume | F16C 27/02 |
| | | | | 384/106 |
| 8,734,017 | B1 * | 5/2014 | Colson | F16C 32/0607 |
| | | | | 384/107 |
| 9,790,992 | B1 | 10/2017 | Lingwall et al. | |
| 10,526,974 | B2 * | 1/2020 | Patil | F02C 7/277 |
| 10,550,770 | B2 * | 2/2020 | Foutch | F02C 3/10 |
| 12,173,845 | B1 | 12/2024 | Ganiger et al. | |

FOREIGN PATENT DOCUMENTS

| | | |
|---|---|---|
| DE | 102020106079 A1 | 9/2021 |
| WO | 2015150339 A1 | 10/2015 |

* cited by examiner

*Primary Examiner* — Courtney D Heinle
*Assistant Examiner* — Danielle M. Christensen
(74) *Attorney, Agent, or Firm* — CANTOR COLBURN LLP

(57) ABSTRACT

Aircraft engines include an engine shaft, an air bearing assembly arranged to selectively support the engine shaft, and a shaft support assembly arranged to selectively support the engine shaft. The shaft support assembly includes a shaft support for selectively engaging and disengaging the engine shaft, a centering shaft that supports the shaft support at one end, an actuator operably coupled to an opposite end of the centering shaft, and a biasing member arranged to apply force to engage the shaft support with the engine shaft. The actuator is configured to apply a force to the centering shaft to overcome the biasing force and disengage the shaft support from the engine shaft in response to an operational parameter exceeding a minimum operational value, and when the shaft support is disengaged from supporting the engine shaft, the engine shaft is supported by the air bearing assembly.

20 Claims, 8 Drawing Sheets

SHAFT CENTERING SYSTEMS FOR AIR BEARINGS

BACKGROUND

The subject matter disclosed herein generally relates to aircraft engines and shafts supports for engine shafts of aircraft and, more particularly, to shaft centering systems for air bearings used with engine shafts.

Aircraft engines, such as main engines and auxiliary power units, rely upon rotating components to generate thrust and/or power. The rotating components are mounted to or rotationally attached to one or more engine shafts within the engine. The engine shafts are typically supported on one or more bearing assemblies. Conventionally, such engine shafts are supported on liquid bearing assemblies, such as oil-based bearings. Another type of bearing that may be used to support engine shafts are air bearings. However, air bearings have life limitations based on the number of start and stop cycles. The reason for the life limitation is that a coating on the foils of the air bearings is subjected to wear at low RPMs which is when no lift is being created. That is, at low RPMs or in a stopped state, the foils of the air bearings may materially contact the engine shafts and/or other surfaces, which can result in wear of the foils. Accordingly, the use of air bearings in certain aircraft engine configurations may be difficult to implement while maintaining desired part life and component operation.

SUMMARY

According to some embodiments, aircraft engines are provided. The aircraft engines include an engine shaft, an air bearing assembly arranged and configured to selectively support the engine shaft, and a shaft support assembly arranged and configured to selectively support the engine shaft. The shaft support assembly includes a shaft support configured to selectively engage and disengage from supporting the engine shaft, a centering shaft arranged to travel axially relative to the engine shaft, wherein the shaft support is operably coupled to a first end of the centering shaft, an actuator operably coupled to a second end of the centering shaft, and a biasing member arranged to apply a biasing force to engage the shaft support into supporting engagement with the engine shaft. The actuator is configured to operate and apply a force to the centering shaft to overcome the biasing force and disengage the shaft support from supporting engagement with the engine shaft in response to an operational parameter exceeding a minimum operational value, and when the shaft support is disengaged from supporting engagement with the engine shaft, the engine shaft is supported by the air bearing assembly.

In addition to one or more of the features described herein, or as an alternative, further embodiments of the aircraft engine may include that the shaft support is rotationally attached to the centering shaft.

In addition to one or more of the features described herein, or as an alternative, further embodiments of the aircraft engine may include a support bearing assembly arranged between the centering shaft and the shaft support.

In addition to one or more of the features described herein, or as an alternative, further embodiments of the aircraft engine may include that the air bearing assembly comprises a foil air bearing and an air bearing runner and wherein the shaft support is configured to engage with the air bearing runner to indirectly support the engine shaft.

In addition to one or more of the features described herein, or as an alternative, further embodiments of the aircraft engine may include that the air bearing runner and the shaft support each comprise complimentary tapered surfaces for engagement therebetween.

In addition to one or more of the features described herein, or as an alternative, further embodiments of the aircraft engine may include that the shaft support comprises a tapered end arranged to directly engage with the engine shaft.

In addition to one or more of the features described herein, or as an alternative, further embodiments of the aircraft engine may include that the actuator is a pressure expansion actuator, wherein the operational parameter is a pressure of the aircraft engine.

In addition to one or more of the features described herein, or as an alternative, further embodiments of the aircraft engine may include that the pressure expansion actuator comprises a diaphragm that defines an actuation chamber, and wherein the actuator chamber is pressure coupled to a pressure source via a pressure conduit.

In addition to one or more of the features described herein, or as an alternative, further embodiments of the aircraft engine may include that the pressure source is a P3 air supply of the aircraft engine.

In addition to one or more of the features described herein, or as an alternative, further embodiments of the aircraft engine may include that the actuator is a thermal expansion actuator, wherein the operational parameter is a temperature of the aircraft engine.

In addition to one or more of the features described herein, or as an alternative, further embodiments of the aircraft engine may include that the thermal expansion actuator comprises an actuator element that defines an actuation chamber filled with a thermal expansion material, wherein upon expansion of the thermal expansion material the shaft support will be transitioned out of supporting engagement with the engine shaft.

In addition to one or more of the features described herein, or as an alternative, further embodiments of the aircraft engine may include a seal configured to prevent the thermal expansion material from leaking toward the air bearing assembly.

In addition to one or more of the features described herein, or as an alternative, further embodiments of the aircraft engine may include an assembly housing, wherein the centering shaft extends through the assembly housing, and the biasing member is arranged between the shaft support and the assembly housing.

According to some embodiments, methods of operating an aircraft engine are provided. The methods include supporting an engine shaft with a shaft support during operation of the aircraft engine when an operational parameter is below a minimum operational value, actuating the shaft support out of engagement from the engine shaft, with an actuator, in response to the operational parameter meeting or exceeding the minimum operational value, and supporting the engine shaft on an air bearing assembly when the shaft support is actuated out of engagement with the engine shaft.

In addition to one or more of the features described herein, or as an alternative, further embodiments of the methods may include normally biasing the shaft support toward engagement with the engine shaft with a biasing member that applies a biasing force to the shaft support toward engagement with the engine shaft, wherein actuating the shaft support out of engagement comprises overcoming the biasing force with the actuator that operates in response to the operational parameter.

In addition to one or more of the features described herein, or as an alternative, further embodiments of the methods may include that the operational parameter is an operational pressure of the aircraft engine.

In addition to one or more of the features described herein, or as an alternative, further embodiments of the methods may include that the actuator comprises a diaphragm operably connected to the centering shaft and configured to define an actuation chamber that is pressure coupled to a pressure source of the aircraft engine.

In addition to one or more of the features described herein, or as an alternative, further embodiments of the methods may include that the operational parameter is an operational temperature of the aircraft engine.

In addition to one or more of the features described herein, or as an alternative, further embodiments of the methods may include that the actuator comprises a thermal expansion material configured to expand when the operational temperature exceeds a minimum temperature and apply an axial force to the shaft to and cause disengagement from the engine shaft.

In addition to one or more of the features described herein, or as an alternative, further embodiments of the methods may include reengaging the shaft support with the engine shaft when the operational parameter falls below the minimum operational value.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

As shown and described herein, various features of the disclosure will be presented. A more thorough description will now be provided with reference to the accompanying figures. The details shown in the figures are not necessarily to scale, but are shown to aid in understanding the features of the subject technology.

Figure 1:
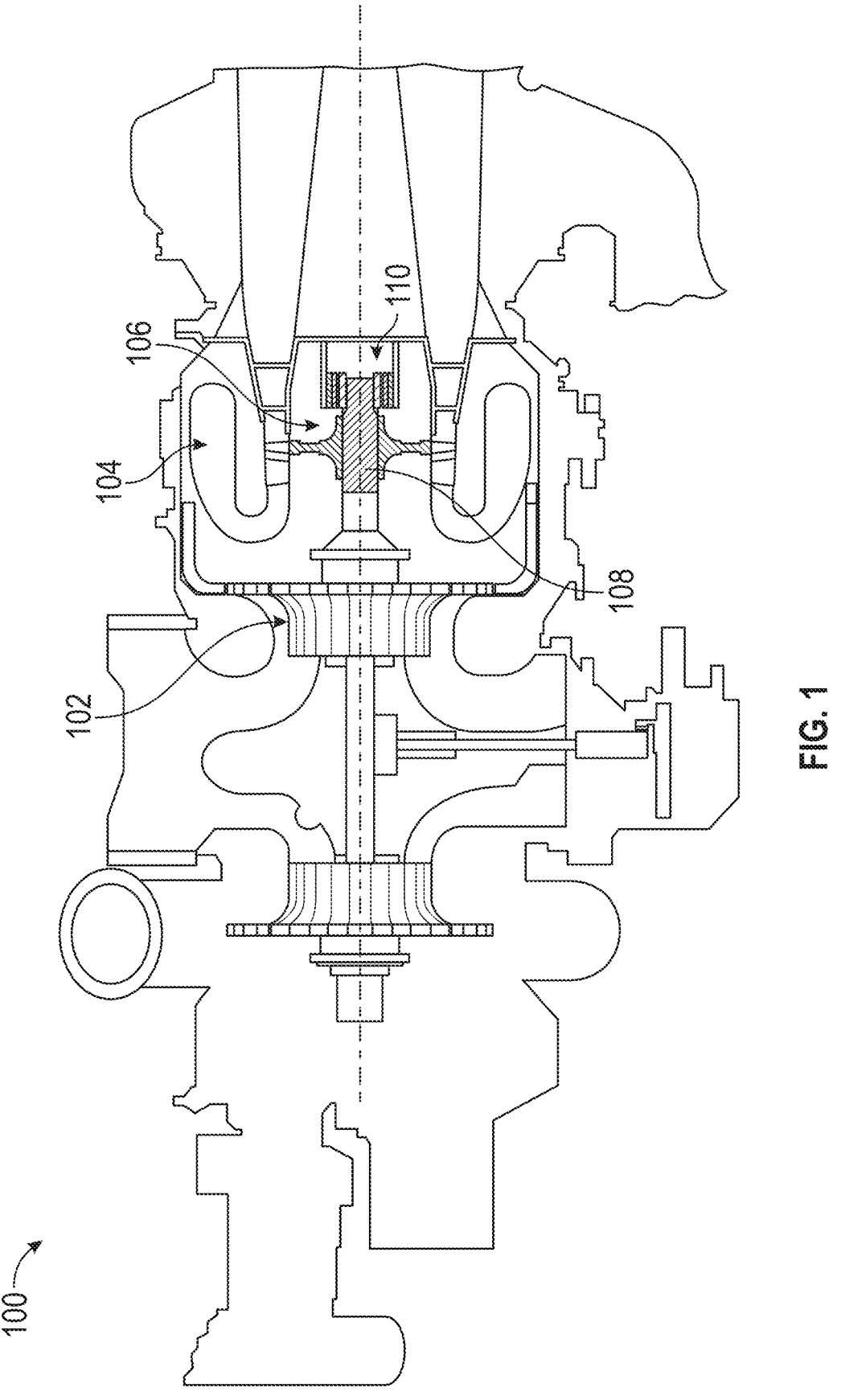
FIG. 1 is a schematic diagram of an aircraft engine in accordance with an embodiment of the present disclosure.

Referring to FIG. 1, a schematic diagram of an aircraft engine 100 that may incorporate embodiments of the present disclosure. The aircraft engine 100 is schematically shown having a compressor 102, a combustor 104, and a turbine 106 arranged in flow series. Air may be compressed within the compressor 102, combusted with fuel in the combustor 104, and passed through the turbine 106 to rotationally drive an engine shaft 108. The engine shaft 108 may be rotationally supported by one or more bearing assemblies 110. Conventionally, engine shaft bearing assemblies may be oil-bearings, which are supplied with a volume of oil that is used for both cooling and lubrication. However, such oil-based bearing systems require supporting components, including pumps, flow lines, seals to prevent leakage, and the like, as will be appreciated by those of skill in the art. In contrast, in accordance with embodiments of the present disclosure, the bearing assemblies 110 may be configured as air bearings, which do not rely upon oil as an operating fluid, but rather rely upon air as a working fluid, thus eliminating oil systems and associated components from the engine configurations, at least with respect to the engine shaft bearing assemblies.

Referring now to FIGS. 2A-2E, schematic illustrations of an aircraft engine 200 in accordance with an embodiment of the present disclosure are shown. The aircraft engine 200 may be a primary propulsion engine, an auxiliary power unit, or other power generator. The aircraft engine 200 includes a compressor 202, a combustor 204, and a turbine 206, similar to that shown in FIG. 1. The turbine 206 and the compressor 202 are rotationally coupled to an engine shaft 208. The engine shaft 208 may be rotationally supported within the aircraft engine 200 on one or more bearing assemblies. For example, as shown in FIGS. 2A-2E, an aft-end of the engine shaft 208 may be supported by an air bearing assembly 210. The air bearing assembly 210 includes a foil air bearing 212 and an air bearing runner 214 that is fixedly and/or rotationally coupled to the engine shaft 208. During running operation of the aircraft engine 200, an air film is formed between the foil air bearing 212 and the air bearing runner 214, allowing for the engine shaft 208 to freely rotate while being supported by the air film of the air bearing assembly 210. However, a minimum RPM is required to maintain the air film, and if the rotational speed drops below the minimum RPM, the weight of the engine shaft 208 may cause contact between the foil air bearing 212 and the air bearing runner 214, resulting in wear and/or damage to the air bearing assembly 210.

To enable the use of the air film bearings, in contrast to oil-based bearings, and to reduce, minimize, or eliminate undue contact or damage to the air bearing assembly 210, the aft end of the engine shaft 208 is arranged to selectively couple with a shaft support assembly 216. The shaft support assembly 216 includes a shaft support 218 that is configured to be moved axially toward or away from the engine shaft 208. The shaft support 218 may be normally biased into engagement with the engine shaft 208. As such, in an off state, a non-running state, and/or a low rotational speed state, the shaft support 218 will engage with the engine shaft 208 to support the engine shaft 208 and prevent the engine shaft 208 from wearing on the air bearing assembly 210.

The shaft support 218 is arranged on and operably coupled to a centering shaft 220 that is configured to be moved axially and drive the shaft support 218 into and out of engagement with the engine shaft 208 of the aircraft engine 200. The centering shaft 220, in combination with the shaft support 218, is configured to support the engine shaft 208 when the shaft support 218 is engaged with the engine shaft 208. When supported by the shaft support 218, the engine shaft 208 will be maintained in a constant radial position, and will not sag due to gravity, and the engine shaft 208 will be prevented from negatively impacting the air bearing assembly 210.

Figure 2A:
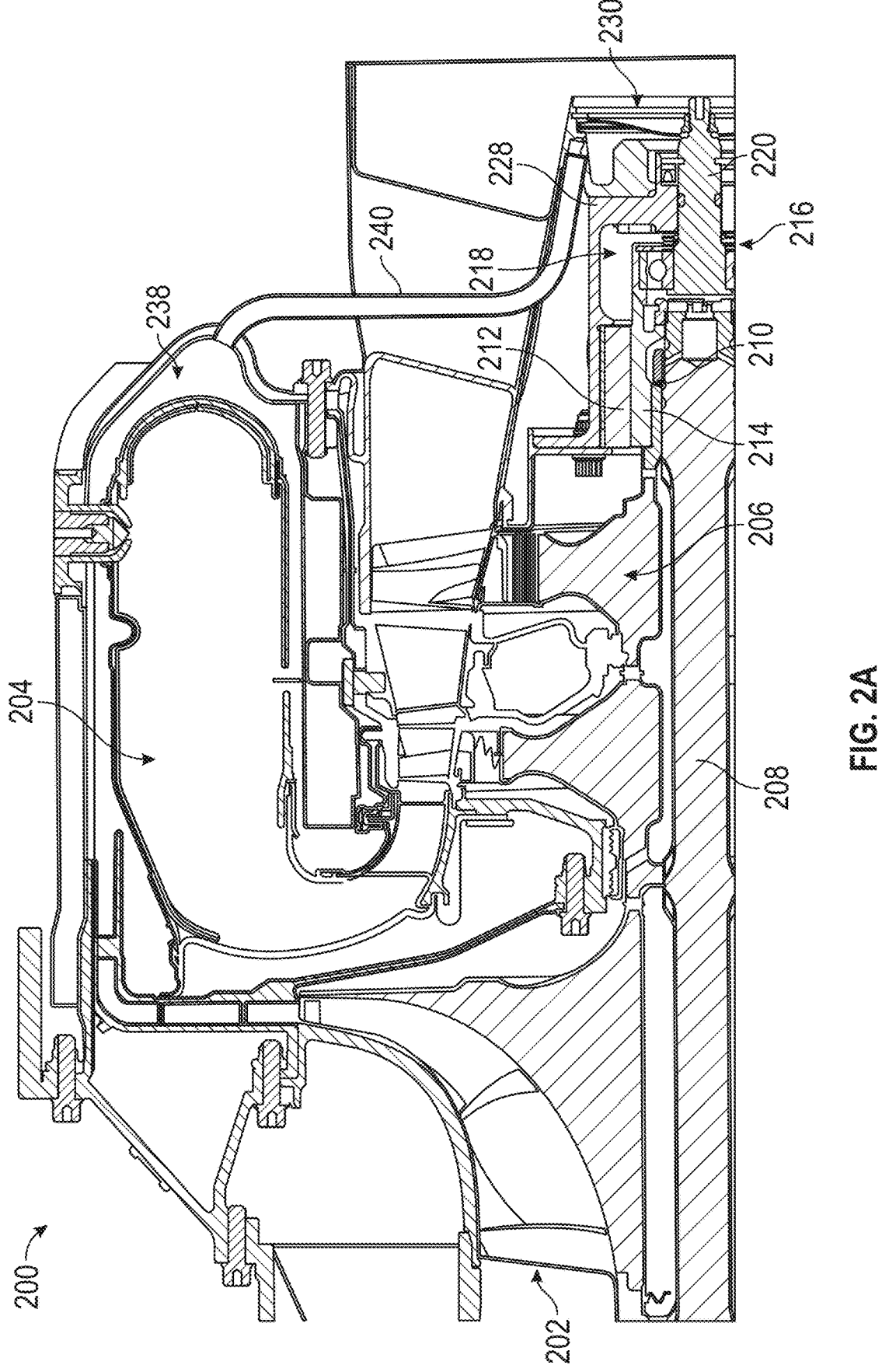
FIG. 2A is a schematic diagram of a portion of an aircraft engine having a shaft support assembly in accordance with an embodiment of the present disclosure.
Figure 2B:
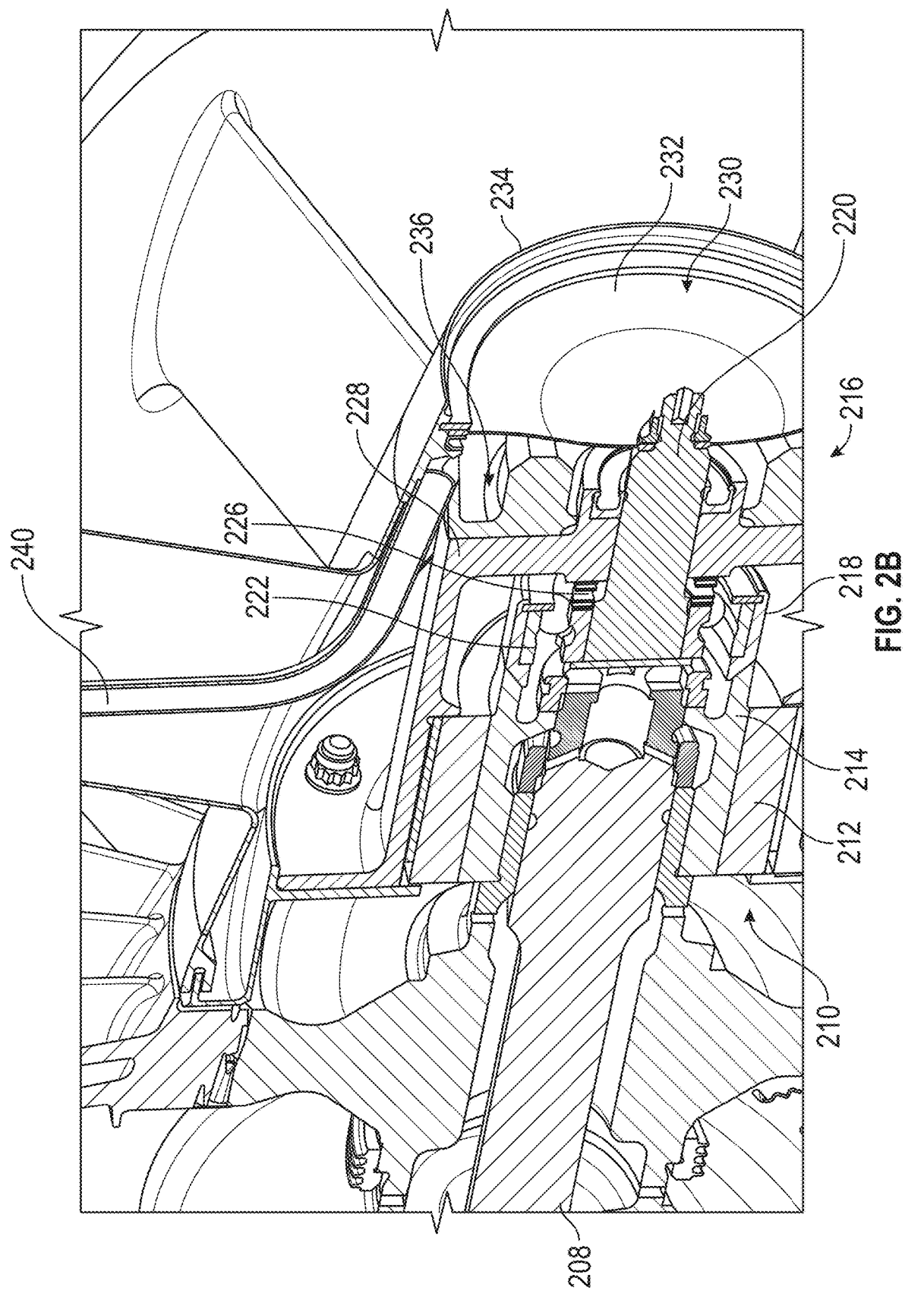
FIG. 2B is an enlarged illustration of the shaft support assembly of FIG. 2A.
Figure 2C:
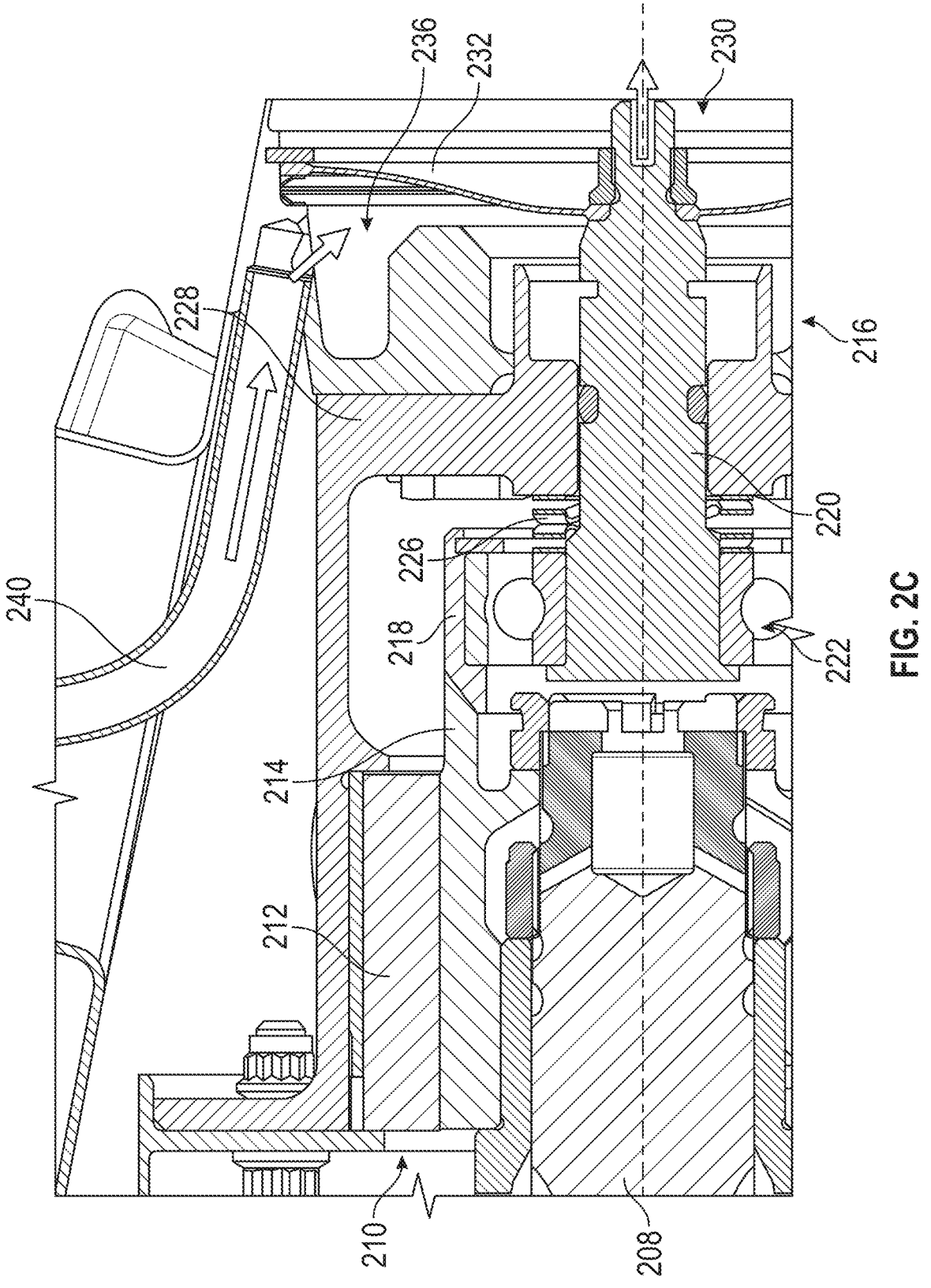
FIG. 2C is another enlarged illustration of the shaft support assembly of FIG. 2A.
Figures 2D, 2E:
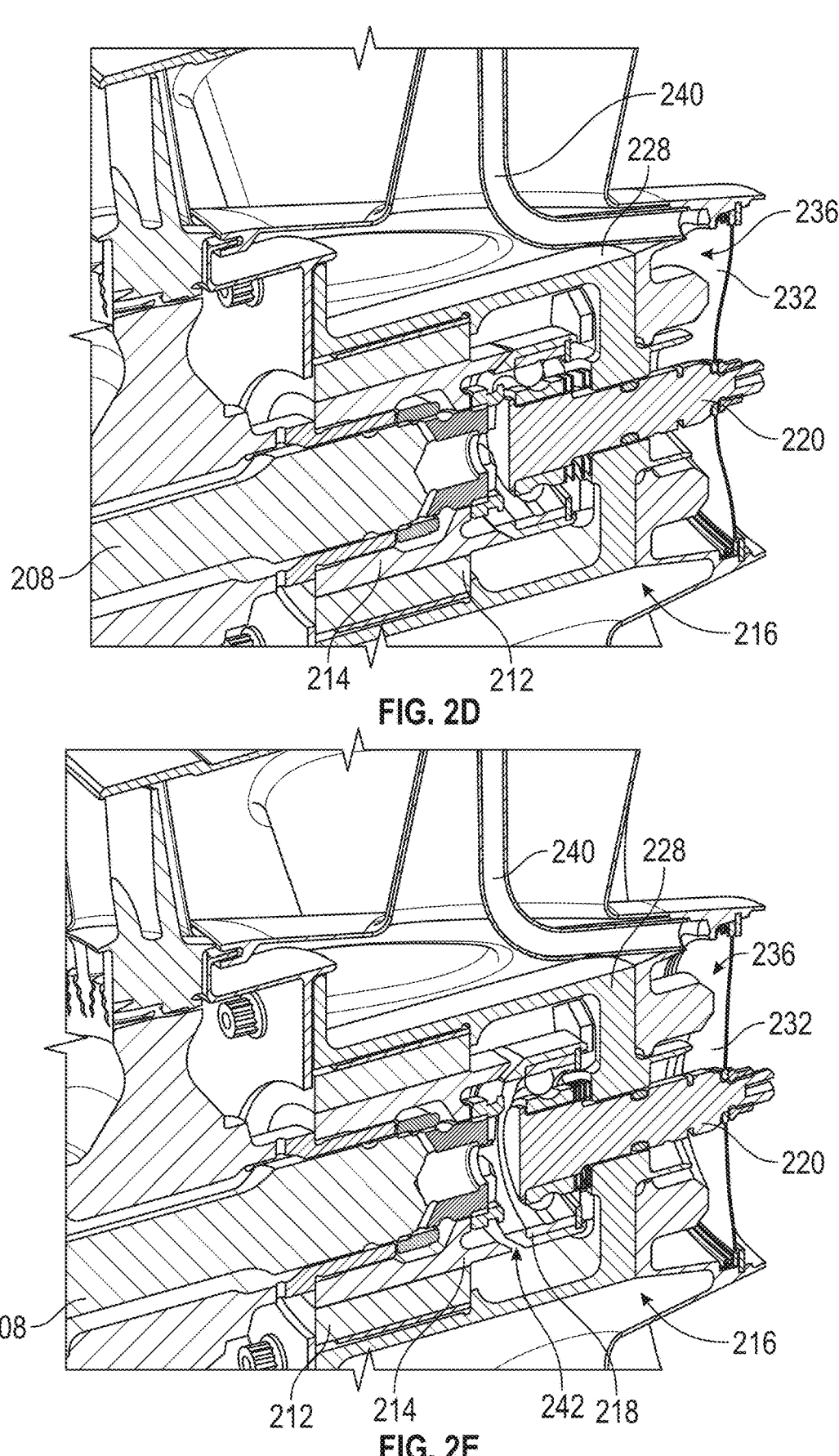
FIG. 2D is a schematic illustration of the shaft support assembly of FIG. 2A shown in an engage state.
FIG. 2E is a schematic illustration of the shaft support assembly of FIG. 2A shown in a disengage state and the shaft is supported by an air bearing.

FIGS. 2B-2D illustrate the shaft support assembly 216 in an engaged state of operation, wherein the shaft support 218 is engaged with the engine shaft 208. FIG. 2E illustrates the actuation of the shaft support assembly 216, and the shaft support 218 disengages from contacting and supporting the engine shaft 208. In this illustrative embodiment, the shaft support assembly 216 includes the shaft support 218 which is rotationally supported and mounted to the centering shaft 220 by a support bearing assembly 222. Accordingly, the centering shaft 220 may be moveable axially and the shaft support 218 may be free to rotate about the support bearing assembly 222, such as when engaged with the engine shaft 208. The shaft support 218 is affixed to the centering shaft 220 such that axial motion of the centering shaft 220 will cause the shaft support 218 to move axially relative to the engine shaft 208, such as into and out of engagement therewith.

In this configuration, the shaft support 218 is configured to engage with the air bearing runner 214 of the air bearing assembly 210 to support the engine shaft 208. As noted above, the air bearing runner 214 is rotationally coupled to the engine shaft 208, and thus rotation of the engine shaft 208 causes rotation of the air bearing runner 214. The foil air bearing 212 is arranged radially outward from the air bearing runner 214 and the engine shaft 208 is arranged radially inward from the air bearing runner 214. The shaft support 218 is configured to be biased into engage with the engine shaft 208, such as shown in FIGS. 2B-2D. The biasing force may be provided by a biasing member 226, such as a spring, arranged between the support bearing assembly 222 and an assembly housing 228 of the shaft support assembly 216. In accordance with some non-limiting embodiments, the shaft support 218 may include a tapered feature that is configured to engage or contact a complimentary tapered feature of the air bearing runner 214. The engagement of the tapered surfaces may be a frictional engagement, such as material contact between the tapered surfaces to provide a temporary fixed connection between the air bearing runner 214 and the support shaft 218. In other embodiments, a keyed arrangement may be used. In still other embodiments, a toothed engagement, a slot-and-key engagement, a set of protrusions and depressions on the surfaces, or the like, may be employed without departing from the scope of the present disclosure.

The shaft support assembly 216 may be selectively actuated to disengage the shaft support 218 from engagement with the air bearing runner 214 and thus disengage from the engine shaft 208. In this non-limiting configuration, the disengagement may be achieved via a pressure expansion actuator 230 arranged at an end of the centering shaft 220 from the support bearing assembly 222. The pressure expansion actuator 230, in this illustrative configuration, includes an actuator element 232 that is sealingly connected to an engine housing 234 at an outer periphery and sealing connected to the centering shaft 220 at an inner periphery. The pressure expansion actuator 230 is configured to define an actuation chamber 236 between the actuator element 232 and surfaces of the housings 228, 234. In this illustrative configuration, the actuator element 232 is configured as a diaphragm. In some such embodiments, the diaphragm may be formed from a flexible metal material, and may be selected to have a biasing or elastic property to allow for deformation of the diaphragm during actuation.

The actuation chamber 236 may be fluidly coupled to a pressure source 238 via a pressure conduit 240. The pressure source 238 may be any source of pressure that can provide the necessary pressures to cause actuation of the pressure expansion actuator 230. In this illustrative configuration, the pressure source 238 is a P3 air supply, which is defined about the combustor 204. The pressure source 238 may thus receive compressed air from the compressor 202. As such, as the pressure increases due to operation of the compressor 202, the pressure within the actuation chamber 236 may be increased. As the pressure is increased in the actuation chamber 236, the actuator element 232 may be actuated and expand outward (or axially aft). As the actuator element 232 is actuated, it will apply an axial force to the centering shaft 220, which in turn will cause the support bearing assembly 222 to be moved axially aft and compressing the biasing member 226 and overcoming the spring force thereof. As the biasing member 226 is axially compressed in a direction away from the engine shaft 208, due to actuation of the actuator element 232, the shaft support 218 will be moved axially aft and away from the air bearing runner 214. Accordingly, actuation of the pressure expansion actuator 230 will cause disengagement of the shaft support 218 from the air bearing runner 214 and the engine shaft 208. With the shaft support 218 disengaged, the air bearing assembly 210 will support the engine shaft 208.

In operation, from a non-rotational state, the shaft support 218 is engaged with the engine shaft 208 via the air bearing runner 214. As the engine shaft 208 begins to rotate, the engine shaft 208 will be rotationally supported on the shaft support 218, and shaft support 218 will rotate with the engine shaft 208 about the support bearing assembly 222. As the engine begins to increase in rotational speed, the pressure of the air at the pressure source 238 will increase, thereby increasing the pressure within the actuation chamber 236, via the pressure conduit 240. When the pressure within the actuation chamber 236 reaches a minimum threshold pressure, the actuator element 232 will extend axially outward (aft, away from the engine shaft 208) and apply a force to the centering shaft 220. As the centering shaft 220 is urged axially away from the engine shaft 208, the biasing force of the biasing member 226 will be overcome, urging the shaft support 218 out of operable coupling with the engine shaft 208. As shown in FIG. 2E, a separation gap 242 is defined between the shaft support 218 and the air bearing runner 214, and the engine shaft 208 becomes supported on the air bearing assembly 210. If or when the pressure within the actuation chamber 236 drops below the minimum threshold pressure, the biasing force of the biasing member 226 will urge the shaft support 218 back into engagement with the air bearing runner 214 and thereby support the engine shaft 208. In some configurations, the actuator element 232 may provide a resetting biasing force to urge the shaft support 218 into operable engagement with the engine shaft 208, as the only biasing force or in combination with the biasing member 226.

In the above illustrated and described configuration, the shaft support 218 is configured to selectively contact and engage with the air bearing runner 214. The air bearing runner 214 is fixedly and rotationally connected to the engine shaft 208, and thus the contact and support provided by the shaft support 218 when engaged with the air bearing runner 214 will result in support of the engine shaft 208. In other configurations in accordance with the present disclosure, the shaft support may be configured to directly interface with the engine shaft.

Figure 3A:
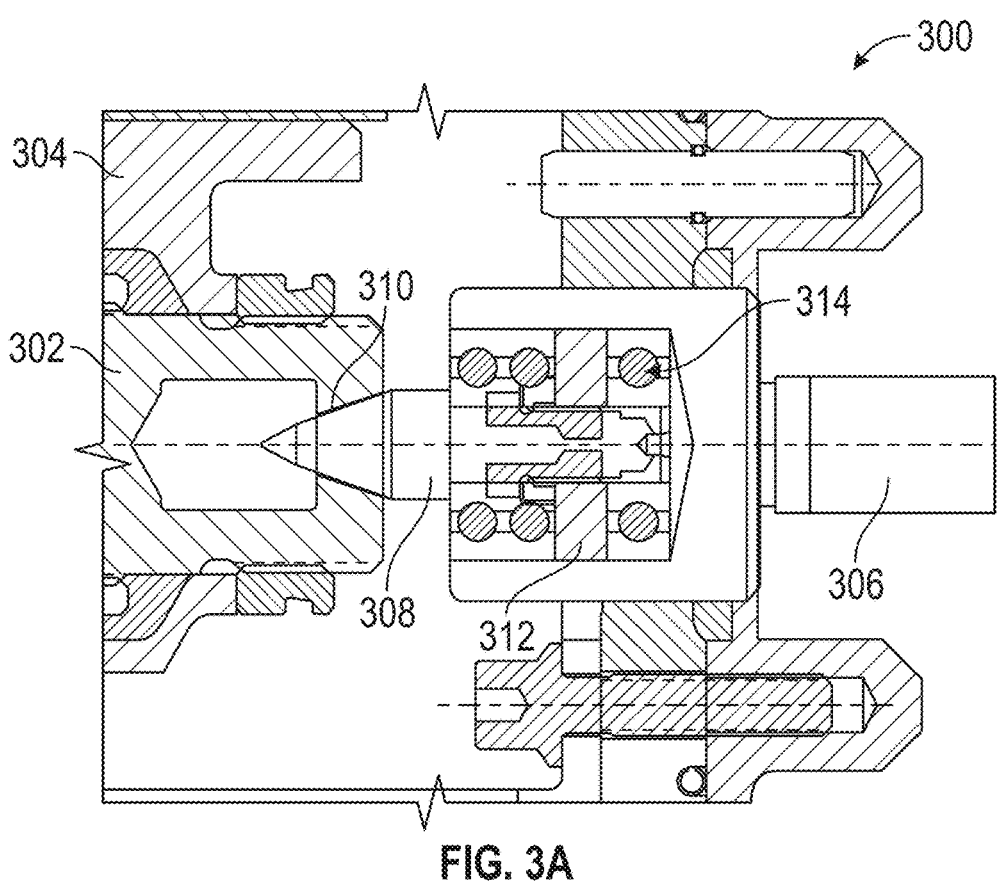
FIG. 3A is a schematic illustration of another configuration of a shaft support in accordance with an embodiment of the present disclosure, shown in an engaged state.
Figure 3B:
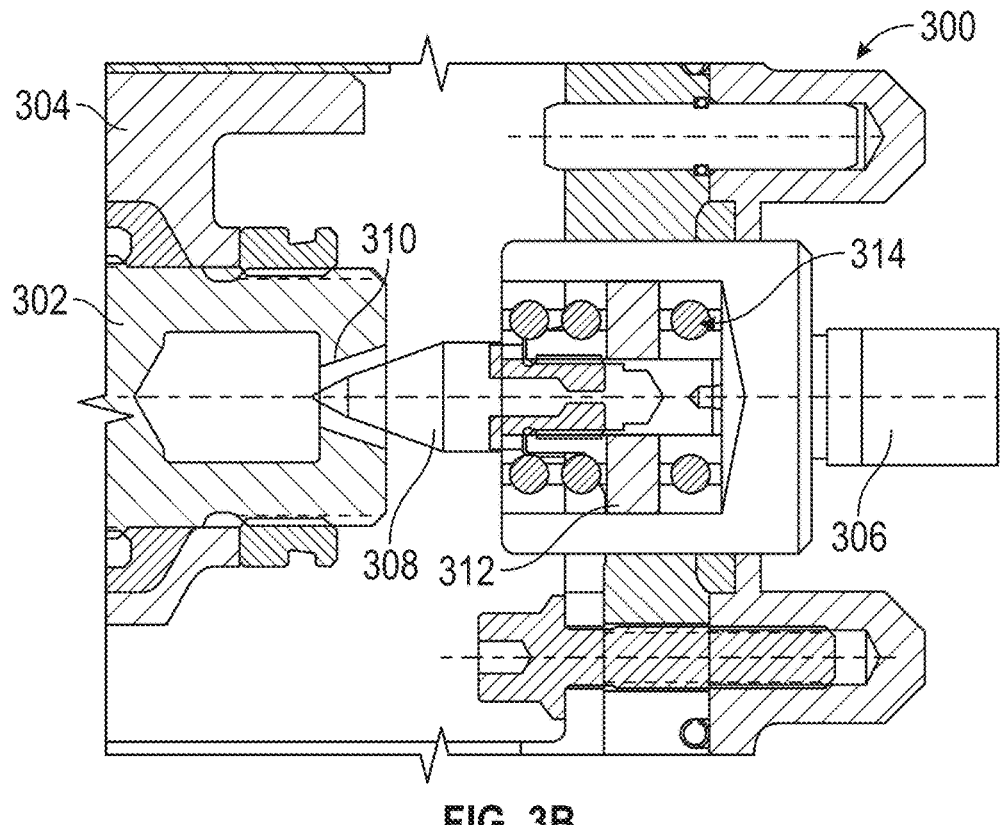
FIG. 3B is a schematic illustration of the shaft support of FIG. 3A, shown in a disengaged state.

For example, referring now to FIGS. 3A-3B, schematic illustrations of a shaft support assembly 300 in accordance with an embodiment of the present disclosure are shown. FIG. 3A illustrates the shaft support assembly 300 in an engaged state, such as engine off or low rotational speeds, and FIG. 3B illustrates the shaft support assembly 300 in a disengaged state, such as during engine running or at rotational speeds that meet or exceed a minimum RPM. As shown, the shaft support assembly 300 is configured to selectively engage with an engine shaft 302, which may be rotationally supported on an air bearing assembly, including an air bearing runner 304.

As shown, the shaft support assembly 300 includes a centering shaft 306 that may be arranged similar to that shown and described above or described further below. The centering shaft 306 may be arranged with a normal bias applied in a forward direction, toward the engine shaft 302. The normal bias may be applied by a biasing element, such as a spring, diaphragm, or other means, as will be appreciated by those of skill in the art. The shaft support assembly 300 includes a shaft support 308 that is configured to selectively engage with the engine shaft 302. In this illustrative configuration, the shaft support 308 includes a tapered end that is configured to engage with a tapered surface 310 of the end of the engine shaft 302. The shaft support 308 is rotationally mounted to or within an end of the centering shaft 308. The centering shaft 308 is configured to travel axially in line with an axis through the engine shaft 302, such as by means of a diaphragm, spring, expansion element, piston, linear actuator, or the like. The shaft support 308 is axially fixed to the centering shaft 306 by means of a connector 312 and rotationally supported on a support bearing assembly 314. The support bearing assembly 314 allows for the shaft support 308 to rotate with the engine shaft 302 when the two elements are engaged together.

In operation, the shaft support 308 is normally biased into engagement with the engine shaft 302 (FIG. 3A). However, as the rotation of the engine shaft 302 increases, the air bearing that includes the air bearing runner 304 will form an air film to provide support for the engine shaft 302. With the air film formed, and the air bearing supporting the engine shaft 302, the shaft support 308 can disengage from the engine shaft 302. The shaft support 308 will be maintained out of engagement with the engine shaft 302 until the pressure drops sufficiently to trigger actuation of the shaft support 308 back into engagement with the engine shaft 302, such as by means of a spring or other biasing member. When the shaft support 308 contacts the tapered surface 310 of the end of the engine shaft 302, the shaft support 308 can provide centering and mechanical support to avoid sagging or changing of radial position of the engine shaft 302 relative to the air bearing, thus avoiding contact with and/or damage to the air bearing assembly.

In the embodiment of FIGS. 2A-2E, the actuation of the shaft support assembly 216 is achieved via a pressure connection between the actuation chamber 236 and another location on the engine (e.g., pressure source 238). This change is pressure is used to apply a pressure to the actuator element 232 or similar structure. As the actuator element 232 is acted upon by the pressure, the actuator element 232 will pull on the centering shaft 220 and when the pulling force is sufficient to overcome the biasing force of the biasing member 226, the shaft support 218 will disengage from the engine shaft 208, allowing for the engine shaft 208 to be rotationally supported by the air bearing assembly 210. It will be appreciated that other types of actuation may be performed to cause the disengagement of the shaft support from the engine support.

Figure 4A:
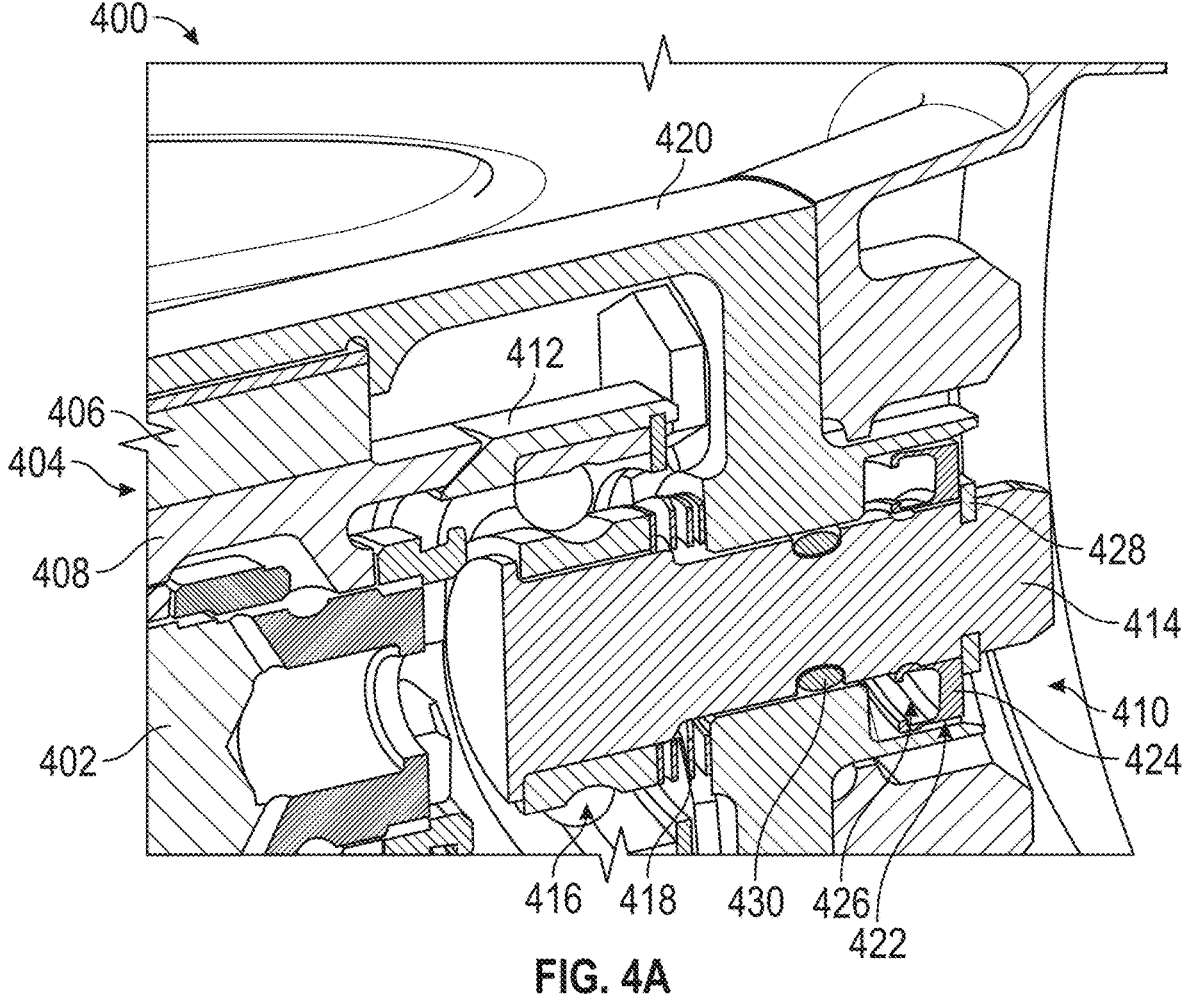
FIG. 4A is a schematic illustration of another configuration of a shaft support assembly in accordance with an embodiment of the present disclosure.
Figures 4B, 4C:
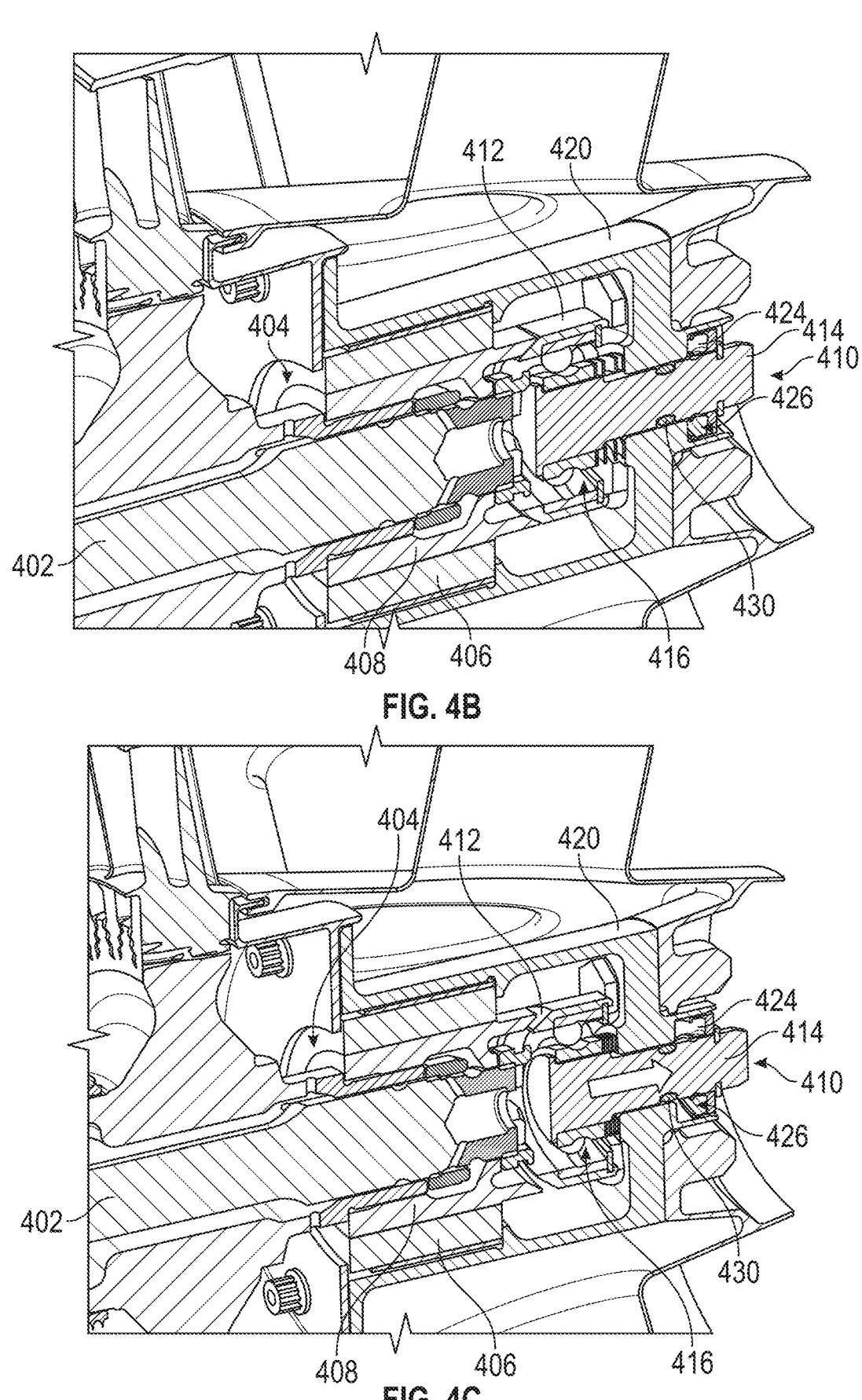
FIG. 4B illustrates the shaft support assembly of FIG. 4A shown in an engaged state.
FIG. 4C illustrates the shaft support assembly of FIG. 4A shown in a disengaged state.

For example, referring now to FIGS. 4A-4C, schematic illustrations of a portion of an aircraft engine 400 in accordance with an embodiment of the present disclosure are shown. The aircraft engine 400 may be a primary propulsion engine, an auxiliary power unit, or other power generator. The aircraft engine 400 includes a compressor, a combustor, and a turbine, similar to that shown and described above. The turbine and the compressor are rotationally coupled to an engine shaft 402. The engine shaft 402 may be rotationally supported within the aircraft engine 400 on one or more bearing assemblies. For example, as shown in FIGS. 4A-4C, an aft-end of the engine shaft 402 may be supported by an air bearing assembly 404. The air bearing assembly 404 includes a foil air bearing 406 and an air bearing runner 408 that is fixedly and/or rotationally coupled to the engine shaft 402. During running operation of the aircraft engine 400, an air film is formed between the foil air bearing 406 and the air bearing runner 408, allowing for the engine shaft 402 to freely rotate while being supported by the air film of the air bearing assembly 404. However, a minimum RPM is required to maintain the air film, and if the rotational speed drops below the minimum RPM, the weight of the engine shaft 402 may cause contact between the foil air bearing 406 and the air bearing runner 408, resulting in wear and/or damage to the air bearing assembly 404.

To enable the use of the air film bearings, in contrast to oil-based bearings, and to reduce, minimize, or eliminate undue contact or damage to the air bearing assembly 404, the aft end of the engine shaft 402 is arranged to selectively couple with a shaft support assembly 410. The shaft support assembly 410 includes a shaft support 412 that is configured to be moved axially toward or away from the engine shaft 402. The shaft support 412 may be normally biased into engagement with the engine shaft 402. As such, in an off state, a non-running state, and/or a low rotational speed state, the shaft support 412 will engage with the engine shaft 402 to support the engine shaft 402 and prevent the engine shaft 402 from wearing on the air bearing assembly 404.

The shaft support 412 is arranged on and operably coupled to a centering shaft 414 that is configured to be moved axially and drive the shaft support 412 into and out of engagement with the engine shaft 402 of the aircraft engine 400. The centering shaft 414, in combination with the shaft support 412, is configured to support the engine shaft 402 when the shaft support 412 is engaged with the engine shaft 402. When supported by the shaft support 412, the engine shaft 402 will be maintained in a constant radial position, and will not sag due to gravity, and the engine shaft 402 will be prevented from negatively impacting the air bearing assembly 404.

FIGS. 4A-4B illustrate the shaft support assembly 410 in an engaged state of operation, wherein the shaft support 412 is engaged with the engine shaft 402. In this configuration, the engagement between the shaft support 412 and the engine shaft 402 is through the air bearing runner 408. FIG. 4C illustrates the actuation of the shaft support assembly 410, and the shaft support 412 disengages from contacting and supporting the engine shaft 402. In this illustrative embodiment, the shaft support assembly 410 includes the shaft support 412 which is rotationally supported and mounted to the centering shaft 414 by a support bearing assembly 416. Accordingly, the centering shaft 414 may be moveable axially and the shaft support 412 may be free to rotate about the support bearing assembly 416, such as when engaged with the engine shaft 402. The shaft support 412 is affixed to the centering shaft 414 such that axial motion of the centering shaft 414 will cause the shaft support 412 to move axially relative to the engine shaft 402, such as into and out of engagement therewith.

In this configuration, the shaft support 412 is configured to engage with the air bearing runner 408 of the air bearing assembly 404. As noted above, the air bearing runner 408 is rotationally coupled to the engine shaft 402, and thus rotation of the engine shaft 402 causes rotation of the air bearing runner 408. The foil air bearing 406 is arranged radially outward from the air bearing runner 408 and the engine shaft 402 is arranged radially inward from the air bearing runner 408. The shaft support 412 is configured to be biased into engage with the engine shaft 402, such as shown in FIGS. 4A-4B. The biasing force may be provided by a biasing member 418, such as a spring, arranged between the support bearing assembly 416 and an assembly housing 420 of the shaft support assembly 410.

The shaft support assembly 410 may be selectively actuated to disengage the shaft support 412 from engagement with the air bearing runner 408 and thus disengage from the engine shaft 402. In this non-limiting configuration, the disengagement may be achieved via a thermal expansion actuator 422. The thermal expansion actuator 422 is configured to generate an axial force to urge the shaft support 412 out of engagement with the engine shaft 402 (or the air bearing runner 408 of this configuration).

The thermal expansion actuator 422 includes an actuator element 424, such as a ring, which defines an actuation chamber 426. The actuation chamber 426 is defined between the actuator element 424 and surfaces of the assembly housing 420 of the shaft support assembly 410. In this configuration, the actuation chamber 426 may be filled with a thermal expansion material, such as wax, gel, phase-change material, or other material. The thermal expansion material may be selected to increase in volume in response to an increase in temperature. In some non-limiting embodiments, the thermal expansion material may be selected to expand by a minimum expansion volume when a predetermined temperature or temperature range is reached. That is, in response to the thermal expansion material being exposed to a predetermined or minimum temperature, the material of the thermal expansion material will expand in volume, resulting in a force being applied to the actuator element 424. The actuator element 424 will then apply an axial force in a direction away from the engine shaft 402 upon the centering shaft 414, such as via a securing element 428. The securing element 428 is configured to ensure that a force is transferred from the actuator element 424 to the centering shaft 414, to thereby cause the centering shaft 414 to travel axially away from the engine shaft 402. This axial force will overcome a biasing force of the biasing member 418, which is biased toward the engine shaft 402, and urge shaft support 412 out of operable engagement and support of the engine shaft 402. When the shaft support 412 is disengaged from the engine shaft 402 (and the air bearing runner 408), the engine shaft 402 may be supported by an air film of the air bearing assembly 404.

The thermal energy applied to the thermal expansion material may be provided by engine operation. That is, as the aircraft engine 400 is started up and begins running, the combustion of fuel will raise the temperature of the components of the aircraft engine 400. This temperature increase will be received at the thermal expansion material to cause expansion of the material within the actuation chamber 426. In this embodiment, because a non-gaseous source of material is employed for the expansion (thermal expansion material), a seal 430 may be provided to prevent leakage of the thermal expansion material. The seal 430 in this configuration provides a seal between surfaces of the centering shaft 414 and the housing 420 and prevents fluid communication between the actuation chamber 426 and the rest of the components of the shaft support assembly 410 within the assembly housing 420. The seal 430 may prevent fluids from reaching the air bearing assembly 404, thereby ensuring that the air film of the air bearing assembly 404 is not negatively impacted.

Air bearings have life limitations driven by the number of start and stop cycles. As a result, such air bearings have been typically avoided for use on aircraft engines, due to reduced part life. For example, the coating and material of the foils of the air bearings may be subjected to wear at low operational speeds (e.g., low RPMs) of an aircraft engine. This is due to no lift is being created as a result of the low rotational speeds. To operate properly, air bearings require minimum rotational speeds to ensure that a film of air is formed between the air bearing and the air bearing runner. At the minimum operating rotational speed or greater, the air film is formed, and the air bearing can support a shaft or the like, such as shown and described above. However, at rotational speeds below the minimum operating rotational speed of the air bearing, the film may not be formed, resulting in the wear on the parts of the air bearing assembly.

In order to incorporate air bearings in aircraft engine, and particularly for engine shafts, a supporting device is provided to take over or carry the loads of the shaft that would otherwise be borne by the structure/material of the air bearing. Such a shaft support can be configured to automatically engage with the engine shaft to support the engine shaft at low RPM. Such low RPM conditions may exist when starting or spooling down on shutoff of an aircraft engine. In the low RPM conditions, the shaft support may be normally biased into engagement with the engine shaft. However, once rotational speeds reach levels to support film generation and support by the air bearing, the shaft support may disengage from the engine shaft allowing for the engine shaft to be supported by the air bearing.

In accordance with embodiments of the present disclosure shaft support assemblies are provided that are configured to support an engine shaft at operational conditions (including off/shut down) that have a rotational speed, pressure, temperature, etc. that is below a predetermined, threshold, or minimum value. Once the engine is operated and the parameter (rotational speed, pressure, temperature, etc.) meets or exceeds the predetermined, threshold, or minimum value, the shaft support assembly may disengage and shift support of an engine shaft from the shaft support assembly to an air bearing assembly.

The engagement between the shaft support and the engine shaft, in accordance with some embodiments of the present disclosure, may be the default state. That is, the shaft support may be biased into a supporting position to support the engine shaft. The shaft support, in accordance with various embodiments of the present disclosure, may directly engage with the engine shaft (e.g., FIGS. 3A-3B) or may indirectly engage with the engine shaft (e.g., FIGS. 2A-2E, FIGS. 4A-4C). The indirect engagement may be through an air bearing runner or other structure that is fixedly coupled to the engine shaft. As such, during engagement, the shaft support is configured to support the engine shaft. However, as described above, when one or more operational parameters is met, the shaft support may be urged out of engagement with the engine shaft, resulting in an air bearing carrying the load of the engine shaft during operation. If the air bearing fails or the minimum threshold values of the operational parameters drops below the threshold values, the shaft support is configured to reengage with the engine shaft, thereby avoiding damage to an air bearing assembly.

The shaft support is configured to be moved into and out of engagement with the engine shaft (e.g., actuated) by operation of an actuator. The actuator may be a passive actuator that is responsive to changes in operational parameters, such as rotational speed, temperature, or pressure. For example, in some configurations (e.g., FIGS. 2A-2E), a pressure expansion actuator may be used. In such configurations, changes in pressure can cause actuation of a diaphragm or the like via an actuation chamber. The actuation chamber may be fluidly coupled or otherwise pressure-coupled with a portion of the aircraft engine. As the pressure increases within the engine during operation, the pressure will increase within the actuation chamber. At a certain pressure level, the pressure expansion actuator may expand to apply a force to a centering shaft and disengage the shaft support from supporting the engine shaft. As the pressure is reduced due to engine shutdown or the like, the diaphragm or similar element will be pulled upon by a biasing force of a spring or the like, and urge the shaft support back into engagement and supporting relationship with the engine shaft.

In other embodiments, a temperature expansion actuator may be employed (e.g., FIGS. 4A-4C). In such configurations, as the temperature of the engine and structures thereof increases, a thermal expansion material may increase in volume, resulting in a force applied to the centering shaft, as shown and described above. For example, in some such configurations, the actuation chamber may be a wax-filled chamber which, when heated, expands and causes the shaft support to translate away from the supported engine shaft. Upon engine shutdown, the wax will cool due to a reduction in temperature, and combined with a biasing member, moves the shaft support to a resting state that re-engages the shaft support with the engine shaft.

The above-described operations of the actuators are not intended to be limiting. That is, in accordance with other embodiments of the present disclosure, the actuators may take other forms without departing from the scope of the present disclosure. For example, in some embodiments, the actuation may be achieved using pneumatic actuators, magnetic actuators, electric actuators, electromagnetic actuators, or the like. The operation of such actuators may be controlled by a controller or other element. For example, one or more sensors may be arranged to monitor operational parameters of the respective aircraft engine (e.g., pressure sensors, temperature sensors, rotational speed sensors, etc.). The controller may be configured to cause actuation of the actuator in response to one or more parameters exceeding a threshold value, thereby transitioning support of an engine shaft from a shaft support assembly to an air bearing assembly. In such electronic and/or controlled configurations, the shaft support may still be normally biased toward engagement with the engine shaft, as described above.

Advantageously, embodiments described herein provide for aircraft engine systems that incorporate air bearings that support engine shafts. Incorporating such air bearings may eliminate weight and complexity of engine design by eliminating the needs for open- or closed-loop fluid circuits for providing oil-based bearing support to such engine shafts. Furthermore, advantageously, the shaft support assemblies of the present disclosure provide for operational protection to the air bearings by shifting load bearing from the air bearing to the shaft support assembly when the engine is operated below certain operational parameter specifications (e.g., temperature, pressure, rotational speed) or in an off state. Accordingly, the air bearing part life may be extended by avoiding unnecessary wear, rub, and/or damage to occur when an air film is not present.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. An aircraft engine comprising:
an engine shaft;
an air bearing assembly arranged and configured to selectively support the engine shaft; and
a shaft support assembly arranged and configured to selectively support the engine shaft, the shaft support assembly comprising:
a shaft support configured to selectively engage and disengage from supporting the engine shaft;
a centering shaft arranged to travel axially relative to the engine shaft, wherein the shaft support is operably coupled to a first end of the centering shaft;

an actuator operably coupled to a second end of the centering shaft; and a biasing member arranged to apply a biasing force to engage the shaft support into supporting engagement with the engine shaft, wherein the actuator is configured to operate and apply a force to the centering shaft to overcome the biasing force and disengage the shaft support from supporting engagement with the engine shaft in response to an operational parameter exceeding a minimum operational value, and wherein when the shaft support is disengaged from supporting engagement with the engine shaft, the engine shaft is supported by the air bearing assembly.

2. The aircraft engine of claim 1, wherein the shaft support is rotationally attached to the centering shaft.

3. The aircraft engine of claim 2, further comprising a support bearing assembly arranged between the centering shaft and the shaft support.

4. The aircraft engine of claim 1, wherein the air bearing assembly comprises a foil air bearing and an air bearing runner and wherein the shaft support is configured to engage with the air bearing runner to indirectly support the engine shaft.

5. The aircraft engine of claim 4, wherein the air bearing runner and the shaft support each comprise complimentary tapered surfaces for engagement therebetween.

6. The aircraft engine of claim 1, wherein the shaft support comprises a tapered end arranged to directly engage with the engine shaft.

7. The aircraft engine of claim 1, wherein the actuator is a pressure expansion actuator, wherein the operational parameter is a pressure of the aircraft engine.

8. The aircraft engine of claim 7, wherein the pressure expansion actuator comprises a diaphragm that defines an actuation chamber, and wherein the actuator chamber is pressure coupled to a pressure source via a pressure conduit.

9. The aircraft engine of claim 8, wherein the pressure source is a P3 air supply of the aircraft engine.

10. The aircraft engine of claim 1, wherein the actuator is a thermal expansion actuator, wherein the operational parameter is a temperature of the aircraft engine.

11. The aircraft engine of claim 10, wherein the thermal expansion actuator comprises an actuator element that defines an actuation chamber filled with a thermal expansion material, wherein upon expansion of the thermal expansion material the shaft support will be transitioned out of supporting engagement with the engine shaft.

12. The aircraft engine of claim 11, further comprising a seal configured to prevent the thermal expansion material from leaking toward the air bearing assembly.

13. The aircraft engine of claim 1, further comprising an assembly housing, wherein the centering shaft extends through the assembly housing, and the biasing member is arranged between the shaft support and the assembly housing.

14. A method of operating an aircraft engine, the method comprising:

supporting an engine shaft with a shaft support during operation of the aircraft engine when an operational parameter is below a minimum operational value;

actuating the shaft support out of engagement from the engine shaft, with an actuator, in response to the operational parameter meeting or exceeding the minimum operational value; and supporting the engine shaft on an air bearing assembly when the shaft support is actuated out of engagement with the engine shaft.

15. The method of claim 14, further comprising normally biasing the shaft support toward engagement with the engine shaft with a biasing member that applies a biasing force to the shaft support toward engagement with the engine shaft, wherein actuating the shaft support out of engagement comprises overcoming the biasing force with the actuator that operates in response to the operational parameter.

16. The method of claim 15, wherein the operational parameter is an operational pressure of the aircraft engine.

17. The method claim 16, wherein the actuator comprises a diaphragm operably connected to the centering shaft and configured to define an actuation chamber that is pressure coupled to a pressure source of the aircraft engine.

18. The method of claim 15, wherein the operational parameter is an operational temperature of the aircraft engine.

19. The method of claim 18, wherein the actuator comprises a thermal expansion material configured to expand when the operational temperature exceeds a minimum temperature and apply an axial force to the centering shaft to and cause disengagement from the engine shaft.

20. The method of claim 14, further comprising reengaging the shaft support with the engine shaft when the operational parameter falls below the minimum operational value.

* * * * *